United States Patent

[11] 3,604,118

| [72] | Inventor | David D. Miller |
| | | 259 S. Robertson Blvd., Beverly Hills, Calif. 90213 |
| [21] | Appl. No. | 2,553 |
| [22] | Filed | Jan. 13, 1970 |
| [45] | Patented | Sept. 14, 1971 |

[54] DRAFTING INSTRUMENT
2 Claims, 15 Drawing Figs.

| [52] | U.S. Cl. | 33/104 |
| [51] | Int. Cl. | B43l 13/14 |
| [50] | Field of Search | 33/104, 1, 77 |

[56] References Cited
UNITED STATES PATENTS

| 651,037 | 6/1900 | Hawkins | 33/104 |
| 777,770 | 12/1904 | Barnes | 33/104 |
| 1,135,259 | 4/1915 | Cokely | 33/112 |
| 1,723,517 | 8/1929 | McFadden | 33/104 |
| 1,845,449 | 2/1932 | Smith | 33/104 |
| 2,858,612 | 11/1958 | Verrett | 33/104 X |
| 3,279,074 | 10/1966 | McQuaid | 33/104 |

FOREIGN PATENTS

| 585,511 | 2/1947 | Great Britain | 33/104 |
| 511,868 | 1/1955 | Italy | 33/104 |

Primary Examiner—Harry N. Haroian
Attorney—Roger A. Marrs

ABSTRACT: A drafting or drawing instrument is disclosed herein comprising a planar member having a base edge and parallel side edges extending perpendicular from the opposite ends of the base edge. An elongated central portion is integrally formed with the member midway between the side edges so as to cantilever outwardly therefrom. A pair of diverging upper edges extend between the opposite sides edges and the junction of the central portion with the member so as to define a pair of equal angles on either side of the central portion. Proportional scales are provided on all straight edges and a plurality of proportional ellipses are formed in the member. Provision is made for carrying a protractor to allow accurate positioning of the member at any 5° increment angle from 0° to 360° so that a single unitary drafting instrument is produced. Means are provided for detachably coupling the member to the arm of a conventional drafting machine and for assisting manual positioning of the member about the working surface of a drafting board.

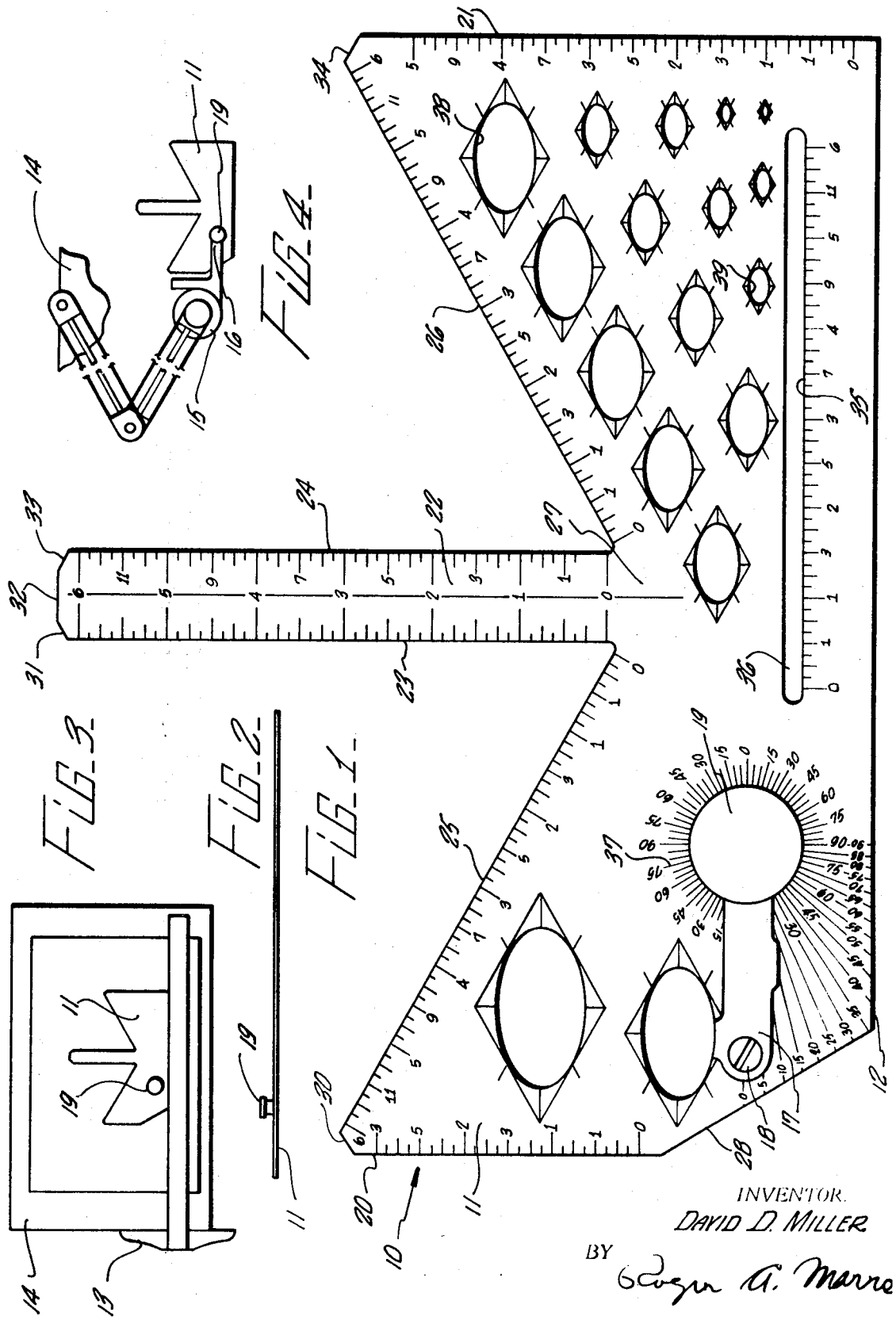

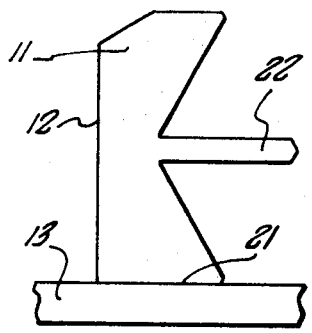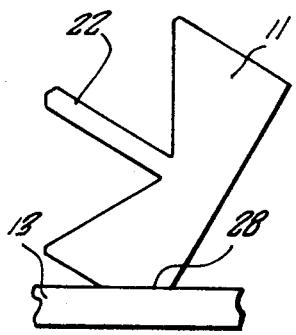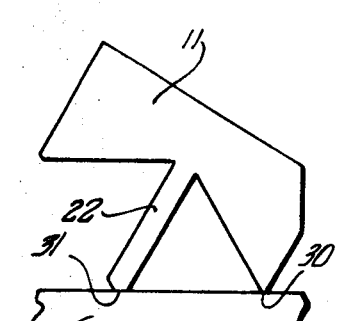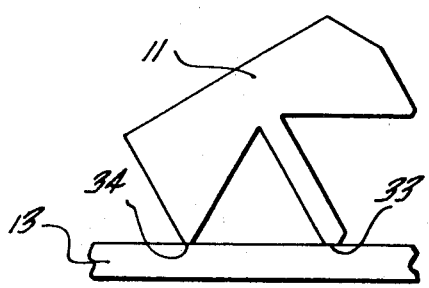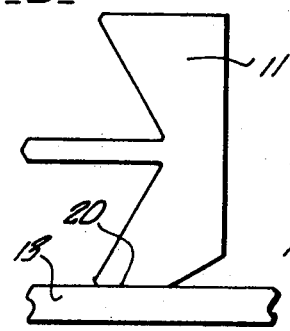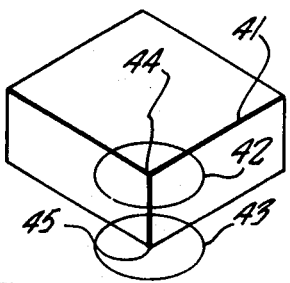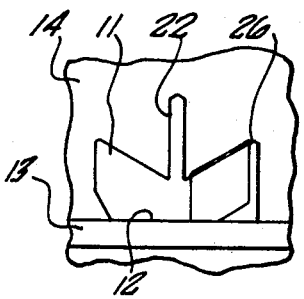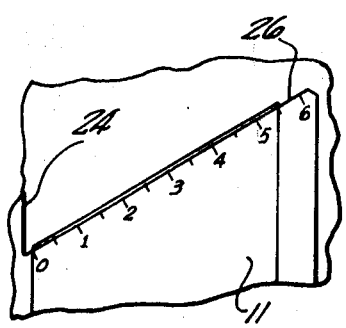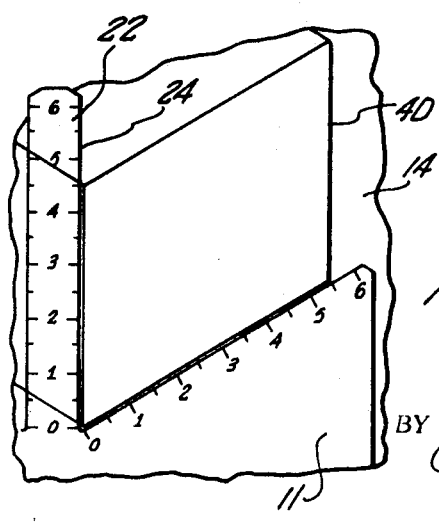

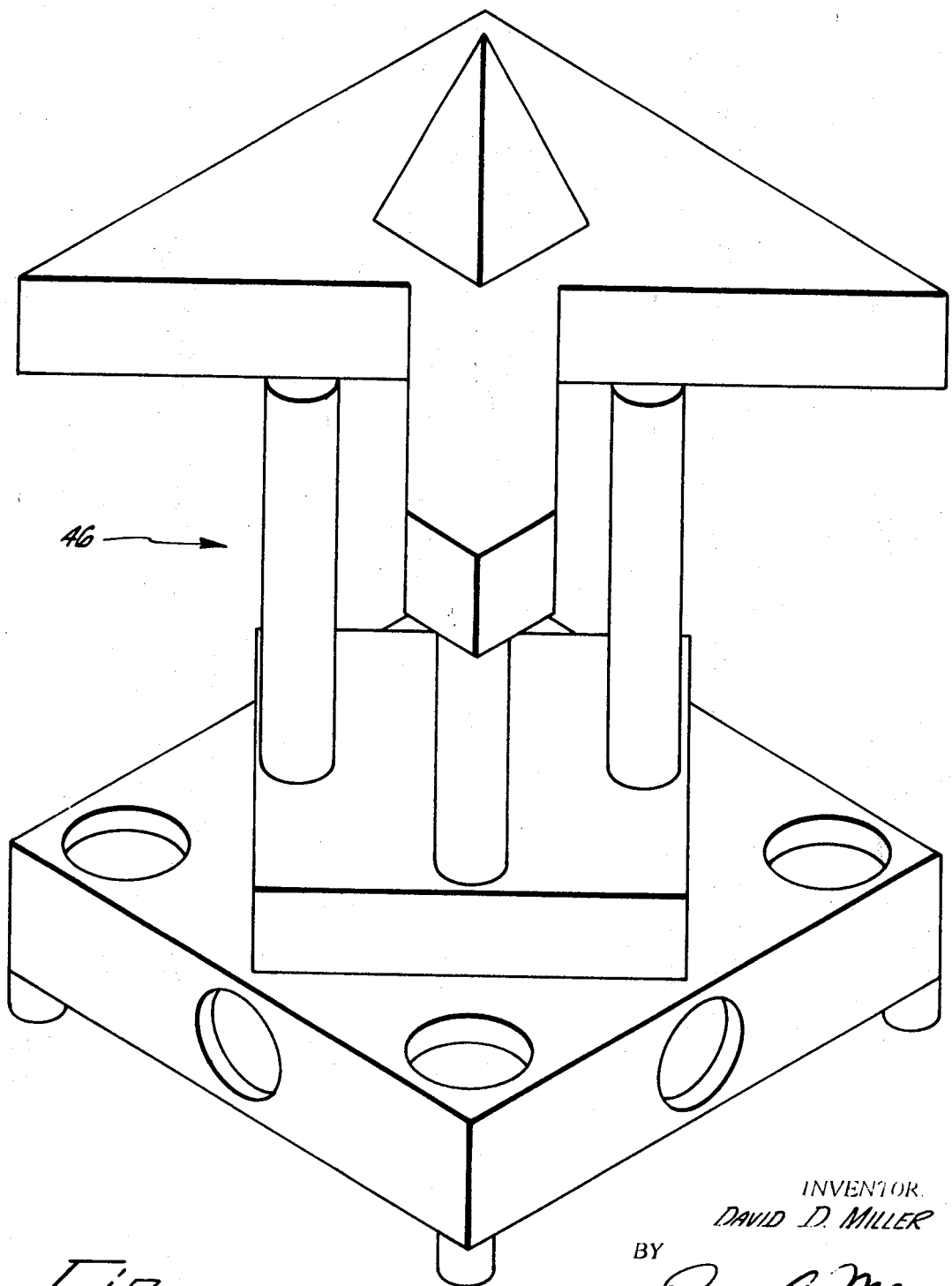

DRAFTING INSTRUMENT

BACKGROUND OF THE INVENTION

1. Field of the Invention

This invention relates to mechanical drawing aids and, more particularly, to a novel drafting instrument incorporating a plurality of specially selected angles, straight edges and a multiplicity of elliptical templates so that a variety of axonometric, orthographic and elevational plan views may be produced by employing a single drafting instrument.

2. Description of the Prior Art

In the visualization of pictorial presentation of objects, it has been found that three-dimensional forms can be more readily and properly interpreted than the illusory, undependable image formed by the visual and mental correlation of the three principle orthographic projections, viz, top, front, and side. Accordingly, draftsman, illustrators, designers, and other engaged in the presentation of pictorial representations, frequently use isometric drawings for illustrating production and articles of manufacture for part catalogues, repair manuals, instruction books, technical manuals, and the like.

Generally, in the presentation of isometric drawings as well as axonometric and orthographic drawings, the illustrator or draftsman spends considerable time in studying the views of an object as well as the object itself in order to properly prepare drawings of the object. Part of the planning time is taken up in determining the selection of individual drafting implements to be used in making the pictorial presentation. At his disposal are a variety of conventional drafting instruments taking the form of triangles, ellipses, protractors, ruled scales and proportional scaled rulers. Additionally, the draftsman may have at his disposal a drafting machine which use may be desired in connection with the proposed pictorial presentation; however, due to the fact that the variety of instruments are not adapted to be coupled to the drafting machine, the machine may be employed only as a conventional T square.

Therefore, a need has long existed to provide a draftsman with a unitary drafting instrument for use in connection with axonometric and orthographic view presentation having desired ruled edges incorporating proportional scales as well as desired angles and scaled elliptical templates.

SUMMARY OF THE INVENTION

Accordingly, the problems and difficulties encountered with conventional drafting instruments are obviated by the present invention which provides a single drafting instrument designed to eliminate the use of a variety of conventional drafting aids. The invention is engineered and designed to assist a draftsman in saving time during the drawing of scaled orthographic views (typical plan and elevational views) and axonometric views (typical isometric views). No new skill or special training is required for persons knowledgeable in the use of normal drafting instruments since the present invention combines into one unitary structure or instrument the function of many other basic drafting instruments or aids now in use. Specifically, the invention combines triangles, scales, protractor and elipse templates into one accurately made instrument.

In one form of the invention, a planar member is provided which includes a base edge adapted to be rested against the top of a T square. The member is formed with a pair of cutouts so as to provide diverging angular upper edges which extend from the opposite sides of the member to the base of a central portion which is integrally formed with the member whereby the opposite edges of the central member are edges forming part of the angle in combination with the angular upper edges. A plurality of scaled elliptical templates are formed in the member and selected ones of the templates are proportionally scaled. A portion of the member is adapted to carry indicia representative of a protractor and other indicia is provided along a variety of edges so as to constitute proportional scaled ruling edges. Each of the ruling edges is adapted to be placed against the edge of a T square for alignment purposes when the draftsman is constructing a drawing or illustration. Other edges and cutouts are provided on the member so as to eliminate the necessity for other working instruments and for providing convenience to the draftsman so that pictorial rendition may be rapidly and easily drawn. Attachment means are carried on a selected portion of the member whereby the member may be detachably coupled to a conventional drafting machine. Also, a knob may be carried on the member which is grasped by the fingers of the user so that the member may be readily positioned about the working surface of the drafting table.

Therefore, it is among the primary objects of the present invention to provide a novel drawing aid to assist a draftsman in the drawing of orthographic projection drawings and axonometric pictorial view drawings.

It is another object of the present invention to provide a novel drafting aid having a plurality of angles, ruled edges and scaled elliptical templates constituting a "combination" drawing instrument in a unitary structure for eliminating a plurality of separate aids or instruments.

Another object of the present invention is to provide a novel drafting instrument or aid which may be employed with a conventional T square, straight edge or drafting machine and which requires no special training of the draftsman.

Yet another object of the present invention is to provide a novel one-piece drafting instrument having means for permitting the draftsman to readily position the instrument over the working surface of a drafting table without the conventional necessity of inserting a release member or article between the underside of the instrument and the working surface.

Still another object of the present invention is to provide a novel drafting instrument providing a unitary structure for performing a multiplicity of drafting functions normally achieved through the use and employment of separate instruments.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIG. 1 is a top plan view of the drafting instrument of the present invention;

FIG. 2 is a reduced, side elevational view of the instrument shown in FIG. 1;

FIG. 3 is a reduced plan view of the instrument illustrated in combination with a conventional T square;

FIG. 4 is a view similar to that of FIG. 3 showing the instrument in use with a drafting machine;

FIGS. 5–9 are reduced plan views of the drafting instrument illustrated in a variety of positions using various straight edges for support and alignment purposes in connection with attaining a plurality of angular relationships;

FIGS. 10–13 are views illustrating the typical steps in constructing the drawing of an isometric cube;

FIG. 14 is an isometric view of a block having ellipses inscribed thereon; and

FIG. 15 is an axonometric drawing of a hypothetical object, illustrating the type of lines and configurations which were actually drawn with the use of the present invention.

DESCRIPTION OF THE PREFERRED EMBODIMENT

Referring to FIG. 1, the novel drafting instrument or aid of the present invention is illustrated in the general direction of arrow 10 which includes a planar member 11 composed of a relatively thick transparent plastic material. Member 11 includes a base edge 12 adapted to be supported against any movable parallel straight edge such as a T square or Jacob's edge. This relationship is shown in FIG. 3 with respect to a conventional T square 13 movably supported on the side edge of a drawing board 14. Also, the member 11 may be releasably carried on the end of an arm of a drafting machine such as shown in FIG. 4 wherein the drafting machine arm 15 includes a releasable chuck mechanism 16 for detachably connecting with a chuck member 17 as shown in FIG. 1. The chuck member 17 includes various notches or receptacles and projections adapted to releasably mate with a variety of different chucks so that the drafting aid member 11 may be suitably carried by different drafting machines and is not restricted to any one machine. Preferably, the chuck 17 is secured to a selected surface of the planar member 11 such as by means of screw fasteners 18 and 19. It is to be understood that fastener 19 includes a knob adapted to project substantially above the surface of member 11 and which is provided with knurled edges for accommodating the grasp of the user's fingers during use.

The knob is more clearly shown in FIG. 2 as being projected above the top surface of member 11 whereby the knob may be readily grasped to effect positioning or manipulation of the member 11 above and over the working surface of the drawing board. Knob 19 may also be used as shown in FIG. 4 when the member 11 is carried on the end of a drafting machine arm.

FIG. 1 further discloses that member 11 includes opposite side edges 20 and 21 which are parallel with respect to each other and extend in perpendicular relationship with respect to the straight edge or base edge 12. Midway between the opposite side edges 20 and 21, there is provided an elongated central portion 22 which is integrally formed at one end thereof with member 11 so as to cantilever therefrom at a location midway between the opposite sides. Central portion or extension 22 is formed with straight edges 23 and 24 on the opposite sides thereof which are in parallel relationship with respect to the opposite side edges 20 and 21.

Member 11 is further formed with upper edges 25 and 26 which are diverging with respect to each other and extend from the respective opposite side edges 20 and 21 toward the midsection of member 11 so as to terminate at the juncture or base 27 area constituting the integral formation of central portion 22 with member 11. The upper edges 25 and 26 form equal angles with respect to straight edges 23 and 24; however, in the present illustration, the angles are represented 30°.

Member 11 is further provided with a straight edge 28 angularly disposed with respect to side edge 20 and base edge 12 so as to provide a 60° angle with respect to the base edge 12. Other angles may be formed, as will be described later, by placing different straight edges against the T square or other parallel straight edges when a drafting machine is employed. Such other straight edges may include corner portions 30 and 31 respectively formed as straight edges on member 11 at the juncture of edge 20 with edge 25, and on the central portion 22 connecting straight edge 23 with a top edge 32. Similarly, straight edges 33 and 34 are formed on the central portion 22 and body member 11.

A ruled edge 35 is formed in the member 11 by a cutout which may take the form of elongated slot 36 adapted to insertably receive a pencil or pen point of a drafting instrument.

The face of member 11 further includes indicia, indicated by numeral 37, which provides a 360° protractor for any angle. The protractor markings allow the instrument to be accurately positioned at any 5° increment angle from 0° to 360°.

Additionally, a variety of ellipse cutouts, as indicated by numerals 38 and 39, are provided for drawing pictorial view circles. Each ellipse is marked with appropriate outline (boxed in axonometric view square) with axes through the center of the axonometric view circle. Preferably, seventeen proportional ellipses are provided from ⅛ inch to 1 inch to 1 inch in 1/16th inch increments plus a 1 ¼ inch and a 1 ½ inch elliptical cutout.

It can be seen that member 11 includes seven straight edges which may be used as six drawing edges for use in drawing both orthographic projections and axonometric pictorial views. The seven fixed drawing edges include edges 20, 21, 23, 24, and 35. All such edges are marked with appropriate scales in selected proportion. Preferably, the precision bevelled drawing edges are each marked with a ⅛ inch, ¼ inch and ½ inch proportional scale.

Referring now to FIGS. 5–9 inclusive, it can be seen that the straight edges provided about the periphery of member 11 may be rested against a T square 13 or other parallel straight edges, such as a drafting machine arm in order to accurately locate member 11 to permit the drawing of selected angles. In this connection it is to be particularly noted that straight surfaces or edges 30 and 31 are in alignment, such as shown in FIG. 7, and that surfaces or edges 33 and 34 are also in alignment. In FIG. 5, side edge 21 is used as the base edge. In FIG. 6, straight edge 28 is used as the base edge while in FIGS. 7 and 8, straight edges 30 and 31 are combined and straight edges 33 and 34 are combined respectively. In FIG. 9, edge 20 serves as the base edge.

Referring now in detail to FIGS. 10–12 inclusive, it can be seen that a perspective cube may be readily drawn using the single instrument or aid of the present invention. Initially, the base edge 12 is seated against the parallel straight edge of T square 13 and one side of the cube is drawn using straight edges 26 and 24. As shown in FIGS. 11 and 13, the edges are proportionally scaled and the member 11 is readily positionable over the working surface 14. The finished cube is shown in FIG. 12 as indicated by numeral 40.

Referring now to FIG. 14, an isometric view of a cube 41 is illustrated having a pair of ellipses 42 and 43 inscribed about each of the intersection points indicated by numerals 44 and 45 respectively. If desired, the ellipses may be inscribed in each of the visible faces of the cube or block 41.

FIG. 15 is an isometric drawing of a hypothetical object, drawn through use of the actual drafting instrument incorporating the present invention. All of the lines shown in the hypothetical object indicated by numeral 46 were drawn employing the straight edges, ellipses and angles carried by member 11. No other single instrument provides such a capability.

Therefore, it can be seen that the device of the present invention provides a compact professional drawing instrument which permits a draftsman to make quick, scaled isometric drawings (measured three-dimensional pictorial views) without the constant shifting and rotation of instruments, triangles, scales and protractors, etc. The present invention combines all of the separate prior art pieces necessary for producing isometric, orthographic and axonometric drawings into one simple instrument. The embodiment of the invention as illustrated includes seven fixed drawing edges, each marked with four conveniently numbered scales ⅛ inch to 1 inch, a 360° protractor in 5° increments, seventeen convenient isometric ellipse cutout templates with axes marked and a variety of angles such as 0°, 30°, 60°, 90° and 150°. The scaled rule marked along the drawing edges are proportional and divided into four increments of calibration. The device is arranged so that a draftsman can draw both the isometric views, regular plan views and elevational views without the delay and irritation of changing back and forth to other conventional instruments. The draftsman may use the drafting aid of the present invention against any movable parallel straight edge such as a T square or Jacob's edge. By employing the chuck member 17, it can be attached to almost any movable parallel arm drafting machine.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A drafting instrument comprising:

a planar member having a base straight edge adapted to engage a T-square and opposite side straight edges extending perpendicular to said base edge at the opposite ends thereof;

an elongated central portion carried on said planar member disposed midway between said opposite side edges and having opposite straight vertical edges extending in parallel to said member side edges;

a pair of diverging upper edges extending from said pair of member opposite side edges to said opposite central portion straight edges so as to define a pair of 30° angles on either side of said central portion;

the upper ends of said member opposite side edges terminating with said diverging upper edges and the lower ends of said member opposite side edges terminating with the opposite ends of said base edge respectively;

aligned, coextensive straight edges formed in said planar member at the intersection of each of said upper edges with said opposite side edges and each of said free corners of said central portion; straight a knob secured to said member in fixed spaced relationship immediately above said base edge and projected above the face thereof;

a protractor having markings carried on the face of said member indicative of a 360° protractor in increments of 5° and coaxially disposed about said knob;

all of said straight and opposite side edges being proportionately scaled in markings along said edges;

said member being formed with a plurality of elliptical templates;

said member being composed of a transparent plastic composition;

a selected one of said opposite side edges including a straight drawing edge intersecting said base edge at a 60° angle;

proportional scale markings carried on the face of said member immediately adjacent each of said central portion straight edges and said pair of upper edges;

said scale markings being divided into at least four increments of calibration; and said central portion cantilevers outwardly from said member wherein side portions of said member on either side of said central portion defined by said upper edges constitute side lobes.

2. A drafting instrument for performing a variety of illustration functions combined in a single unitary device comprising:

a planar member having a base edge and opposite side straight edges perpendicular to said base edge at the opposite ends thereof;

a pair of cutouts formed in said member along its upper edge opposite to said base edge to define an elongated central portion between a pair of pie-shaped lobes;

each of said cutouts defining opposing drawing straight edges converging to intersect at a 30° angle;

proportional scaled markings carried on said member and said central portion immediately adjacent said drawing edges;

aligned and coextensive straight edges formed in said planar member at the intersection of each of said upper edges with said opposite side edges and each of said free corners of said central portion;

a knob fixedly secured to said member and projecting outwardly from a selected face thereof so as to accommodate finger grasping thereof to allow manual positioning of said member about a working surface;

a plurality of markings indicative of a 360° protractor carried on said selected face of said member having outwardly radiating lines spaced apart in 5° increments; and said protractor being disposed coaxially with respect to said knob.